Feb. 24, 1959     N. A. JOHNSON     2,874,717
BRINE TANK FLOAT VALVE CONTROL FOR WATER SOFTENER
Filed March 24, 1958     2 Sheets-Sheet 1
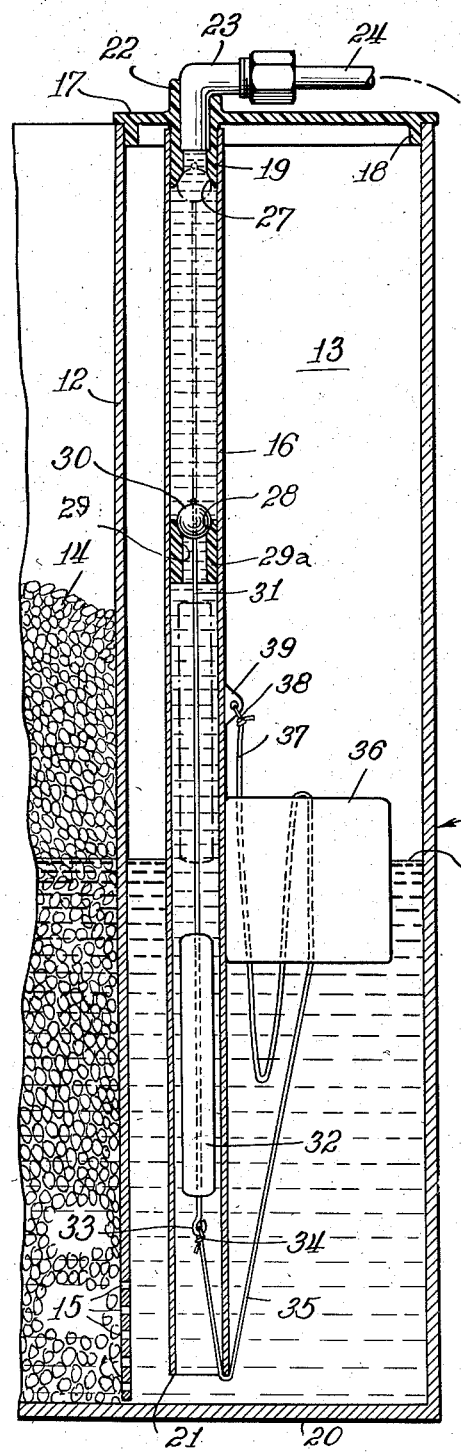
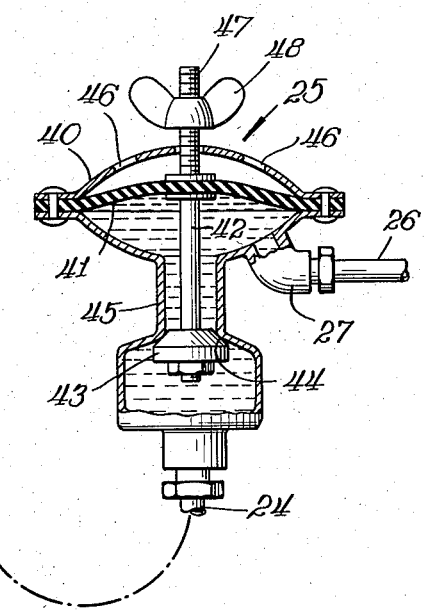
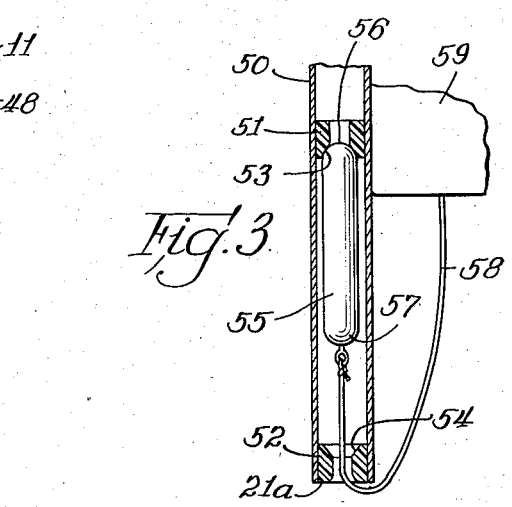
INVENTOR.
Nels A. Johnson
BY
Jones, Darbo & Robertson
Attys.

United States Patent Office 2,874,717
Patented Feb. 24, 1959

2,874,717

BRINE TANK FLOAT VALVE CONTROL FOR WATER SOFTENER

Nels A. Johnson, Palatine, Ill., assignor of one-half to George M. Munson, Lombard, Ill.

Application March 24, 1958, Serial No. 723,227

6 Claims. (Cl. 137—411)

This invention relates to improvements in brine tank float valve controls, more particularly for water softener systems, for controlling the flow of makeup water to and the flow of brine from the brine tank of such apparatus, in the regeneration of the ion exchange material of the system.

In my application Serial No. 702,428 filed December 12, 1957, for "Brine Tank Control System and Valve for Water Softener," I described and claimed automatic valving means for such controls incorporating an auxiliary valve, supplementing the action of the ordinary float valve usually located in the brine well of the brine tank to guard against both overflowing of the brine tank by the makeup water and excessive continued flow of brine, due to imperfect operation of the float valve.

The present invention is directed to the float controlled valve mechanism itself while at the same time showing an auxiliary valve associated therewith for certain purposes as disclosed and claimed in said copending application.

It is to be understood that the float valve control of the present invention, while shown for purposes of illustration in connection with a water softener system, is not necessarily limited to that use and may have other useful applications as will be recognized by those skilled in the art having the benefit of the present disclosure.

An important object of the present invention is to improve and render more positive the action of the float valve mechanism itself by employing a dual float arrangement embodying floats of different buoyancies, one of the floats being enclosed in a downwardly projected extension of the fluid conduit in the form of a dependent tube located within the brine well, such tube normally carrying liquid at all times and thereby availing of the presence of such liquid for the purpose of its effect on the float carried within this tube, there being another float of greater buoyancy outside the tube but within the brine well and which is subject to the action of the liquid in the well, the latter float having an influence upon the float in the tube to improve the operation.

The invention will be understood by reference to the following description of an illustrative embodiment thereof, taken together with the accompanying drawings, and in which drawings:

Figure 1 is a vertical sectional view of the brine well showing an embodiment of the present invention employed therewith, and also showing the auxiliary cutoff valve, this view showing a phase of the regeneration cycle in which the brine tank is ready to discharge brine to the water softener;

Figure 3 shows a modification.

Figure 2:
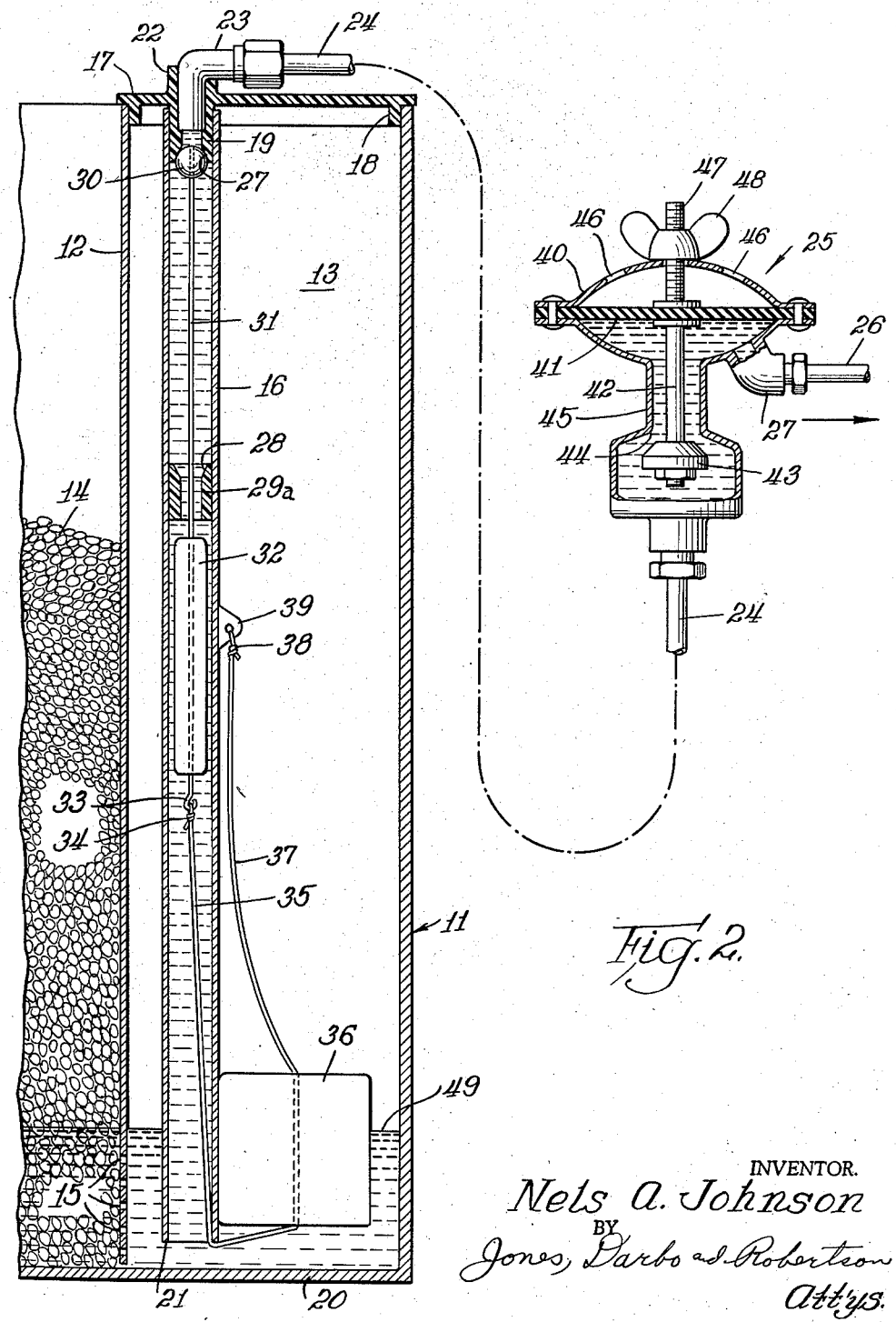
Figure 2 is a view otherwise similar to Fig. 1, but showing the reverse operation after the brine has been discharged and just before makeup water has been returned to the brine tank.

Referring in detail to the illustrative construction shown in the drawings, numeral 11 indicates a conventional brine tank having a partition 12 therein providing the brine well 13, the partition 12 excluding the salt solids 14 from the brine well but permitting the liquid brine to flow thereinto through perforations 15 at its lower end.

In accordance with the present invention, in the brine well 13 is located the vertical tube 16. In this instance the tube 16 is desirably secured to and dependent from a closure fitting 17 for the brine well which may be advantageously formed of suitable plastic material such as polyethylene or the like, closure 17 having a dependent cylindrical flange 18 which fits snugly into the upper end of the brine wall. Tube 16 may also be of a suitable plastic material. Closure 17 also has a downwardly extended hollow boss 19 upon which the tube 16 is telescoped with a snug holding fit so that the tube is suspended from the closure and is spaced from the lower wall 20 of the brine tank as at 21 so as to permit entrance of brine to the tube from the brine well, in one direction and egress of makeup water from the tube to the brine well in the other direction.

The closure 17 also has an upstanding nipple formation 22 aligned with its hollow boss 19 that snugly receives an elbow fitting 23 for a conduit 24 with which the brine tank is connected to the water softener, in this instance through the intermediation of the auxiliary cutoff valve device 25, another pipe 26 being connected to the valve device 25 by fitting 27, continuing the fluid circuit to the softener.

Further in accordance with the present invention, the tube 16 in the brine well carries internally thereof a pair of confronting vertically spaced apart valve seats 27 and 28. The valve seat 27 is conveniently formed integrally with the downward extension 19 of the closure 17, while the valve seat 28 is formed on a spool 29 of say plastic material located by a snug fit intermediately within the tube 16.

Between the valve seats 27 and 28 and for cooperation therewith alternately is located a valve element in the form of the ball valve 30. Depending from the latter is a supporting connection here shown as a somewhat stiff wire 31 that passes by means of the passageway 29a downwardly through spool 29 and on its lower end, below the spool, carries a float 32 elongated in the direction of the tube 16 and fitting loosely therein. Wire 31 at its lower end, below float 32, has an eye 33 to which is tied as at 34 a flexible cable or cord 35, which may be conveniently a length of plastic fish line, for example. Cord 35 runs downwardly of the tube 16, out through its lower end 21, and, outside of the tube, has the second float member 36 attached thereto. Float member 36, as shown, is of larger volume than the float member 32, thereby having greater buoyancy. The float members may be of any suitable construction, either hollow or of a light-weight porous material such as foam expanded polystyrene sold under the trademark "Styrofoam." Float member 36 is desirably anchored to tube 16, exteriorly of the latter, in this instance by a continuation 37 of the cord 35 that is tied as at 38 to an apertured lug 39 on the tube. Cable continuation 37 has suitable slack therein as later explained, but cable 35 is always taut for purposes later described. The cable or cord is non-extensible.

The auxiliary valve device 25 as here illustrated is of the diaphragm type having a body 40 in which is peripherally secured the flexible diaphragm 41 that centrally carries the valve stem 42 terminating at its lower end in the valve plug 43 here shown of the conoidal type that seats in the flared mouth 44 of a constricted annular portion 45 of the valve body. Above the diaphragm 41 the valve body is open to the atmosphere as by holes 46 therein and the valve stem 42 is continued upwardly through the body, being threaded at its upper end as at 47 to have screwed thereonto the thumb nut 48 by which the valve device 25 may be manually closed if desired or the valve 43 limited in movement as described in my said copending patent application.

Operation is as follows:

Figure 1 shows the brine tank just before the brine withdrawal phase. At this time, the appropriate amount of brine in the brine well is ready to be withdrawn for the regeneration step of the water softener apparatus, the level of the brine in the brine well being at its relatively high point as indicated at 48. Larger float 36, which rides on the surface of the brine in the brine well outside the tube 16, is exerting a pull on the cord 35 and through it on the float 32 within the tube 16, drawing the latter downwardly in the tube, and through float 32 and wire 31, holding the ball valve 30 on its lower valve seat 28, shutting off flow of makeup water to the brine tank. Also at this time the auxiliary valve mechanism 25 has been actuated, by line water pressure in the conduit 24 and pipe 26, caused by either complete or partial closing of ball valve 30 to close the valve 43 and prevent flow of makeup water to the brine tank which otherwise might cause overflow of the latter. This action of the auxiliary valve mechanism 25 occurs by reason of superatmospheric pressure therein below the valve diaphragm 41 and merely atmospheric pressure thereabove, thus lifting the valve stem 42 to close valve 43, when valve 30 is on valve seat 28.

When now, the regeneration phase of the cycle is initiated, as by suction applied to the pipe 26 by a brine aspirator or the like, a subatmospheric pressure occurs in the valve mechanism 25 below the diaphragm 41, and, as shown in Fig. 2, the diaphragm moves downwardly by reason of atmospheric pressure thereabove to open the valve 43. Thereupon suction occurs in the conduit 24 and the tube 16 which tends to lift the ball valve 30 off its lower seat 28. Since now valves 30 and 43 are both open, the continued suction plus the buoyancy of the smaller float 32 lifts valve 30 and draws brine from the brine well 13 up through tube 16, through conduit 24, valve mechanism 25 and pipe 26 to the water softener for the regeneration of the ion exchange material of the latter. The larger float 36 is pulled downwardly by this action to permit ball valve 30 to move up off its lower valve seat. During this phase, and as further shown in Fig. 2, the brine level in the brine well 13 drops to its relatively low point as indicated at 49, the larger float 36 dropping with the brine level, as it is permitted to do by the slack in the cord extension 37. At the same time since the tube 16 is full of liquid throughout, the inner small float 32 rises in the tube 16 with the liquid in the tube 16 and in its rise moves the ball valve 30 upwardly, by means of the stiff wire connection 31. This rise, however, of float 32 occurs slowly since it is restrained by the larger float 36 which tends to follow the level of the water in the brine tank outside the tube 16. When this level has dropped to a predetermined low point already referred to as indicated at 49, the inner float 32 is permitted to rise sufficiently in the tube 16 to cause the ball valve 30 to close on its upper valve seat 27. When this occurs, flow of brine from the brine tank is shut off, float 32 holding ball valve 30 to its seat 27 thus for this purpose.

The lower end 21 of the tube 16 functions as a fulcrum changing the direction of pull of the cord 35 so that upward pull thereon by float 36 pulls downwardly on float 32.

As seen in the drawings, wire 31 is of sufficient length so that ball valve 30 may close on upper valve seat 27 while float 32 is well below valve seat spool 29 for the lower valve seat 28.

Repeating the cycle, when suction is discontinued and makeup water begins to flow back through the pipe 26 and conduit 24, ball valve 30 is forced downwardly off its upper valve seat 27. It will not drop immediately, however, to its lower valve seat 28 because it is being sustained by the buoyancy of the inner float 32, there being at this time liquid in the tube 16 throughout its length. Eventually, however, as the larger float 36 rises with the inflow of makeup water to the brine well, the larger float draws the inner float 32 downwardly, through the cord 35, until the ball valve 30 is again caused to seat on its lower valve seat 28, the larger float 36 having now risen back again to the upper level 48 of the liquid in the brine well. Seating of valve 30 on seat 28 again causes back pressure in pipe 24 and thereupon, the auxiliary valve mechanism 25 once more comes into play to positively shut off flow of makeup water to the brine tank, until suction again occurs by reason of the initiation of a succeeding regeneration phase.

Consequently, the ball valve 30 is advantageously subject to a desirable push-pull action, by reason of the dual float arrangement, when it is in both its upper and its lower positions, thus insuring its positive action.

In the modification of Fig. 3, tube 50, corresponding otherwise to the tube 16, has a pair of valve seat spools 51 and 52 therein adjacent the lower end spaced apart vertically therein, providing upper valve seat 53 and lower valve seat 54. Valve member 55 in this instance is an elongated element serving the function both of a valve member and of a float member, being suitably constructed for the latter purpose and having at each end the tapered, or in this instance hemispherical, terminations 56 and 57. Upper termination 56 provides a valve for cooperation with the upper valve seat 53 and lower termination 57 provides a valve for cooperation with the lower valve seat 54. A flexible cord 58 connects the combined valve and float member 55 with the outer float 59, which functions similarly to the float 36 of Fig. 1. When a suitable upper level of liquid occurs in the brine well, float 59 by means of cord 58 draws member 55 down onto the valve seat 54 cutting off or restricting flow of makeup water to the brine tank. When, in the suction stage, float 59 drops with the liquid level in the brine well, cord 58 is payed out by the float 59 to permit inner float 55 to rise and finally to seat on the upper valve seat 53 to shut off the flow of brine. Valve seat spool 52 in this instance is at the lower end 21a of tube 50.

The lower end 21 of tube 16 (and 21a of tube 50) is desirably well below a normal lower level 49 for the brine in the brine well so as to guard against suction of air into the tube.

It is to be understood that the expedients of the present invention, as above described, may be used with or without the auxiliary valve mechanism 25, the latter, covered by my said copending application, being shown as an additional safeguard to guard against overflow of the brine tank. Any other suitable positive cutoff valve could be employed.

An illustrative embodiment of the invention having been disclosed, in accordance with the statutes, it is to be understood that such changes may be made, including modifications or additions, as fall within the spirit of the invention and the scope of the appended claims.

The invention having been described, what is here claimed is:

1. Float valve control for brine tank or the like, comprising, a brine well, a tube in said well communicating at its lower end with the well and at its upper end with a brine conduit, a pair of confronting vertically spaced upper and lower valve seats in the tube, a ball valve in the tube between said seats and cooperating therewith alternately, a first float in the tube below said lower valve seat, a rigid connection between the first float and the ball valve, a second float in the well outside the tube of greater buoyancy than said first float, and a flexible nonextensible connection between the floats passing downwardly through the tube and out its lower end.

2. The structure of claim 1 wherein the first float is elongated in the direction of the tube.

3. The structure of claim 1 wherein the second float is flexibly connected to the exterior of the tube.

4. Float valve control comprising, a liquid well, a tube in said well communicating at its lower end with the well and at its upper end with a liquid conduit, a pair of confronting vertically spaced upper and lower valve seats in the tube, a valve element in the tube between said seats and cooperating therewith alternately, a first float in the tube below said lower valve seat, a rigid connection between the first float and the valve element, a second float in the well outside the tube of greater buoyancy than said first float, and a flexible non-extensible connection between the floats passing downwardly through the tube and out its lower end, whereby upward pull by the one float pulls downwardly on the other float.

5. A float valve comprising a liquid well, a tube in said well communicating at its lower end with the well and at its upper end with a liquid conduit, a pair of confronting vertically spaced upper and lower valve seats in the tube, a buoyant member having plug ends for seating on said valve seats respectively positioned in the tube between said seats and cooperating therewith alternately, a float in the well outside the tube, said float having greater buoyancy than said buoyant member, and a flexible non-extensible connection between said float and said buoyant member passing downwardly through the tube and out its lower end, whereby upward pull by said float pulls downwardly on said buoyant member.

6. A float valve of the class described comprising a well for liquid, a vertical tube therein communicating at its lower end therewith, a float in said well outside said tube, a second float in said tube carrying valve elements, a pair of oppositely oriented seats in the tube for receiving said valve elements thereon, and means connecting the floats whereby movement of one float in one vertical direction is accompanied by movement of the other float in the opposite vertical direction.

References Cited in the file of this patent

UNITED STATES PATENTS

| | | |
|---|---|---|
| 562,543 | Kubach | June 23, 1896 |
| 1,290,358 | Roberts | Jan. 7, 1919 |
| 1,424,756 | Dean et al. | Aug. 8, 1922 |
| 1,653,688 | Alexander et al. | Dec. 27, 1927 |
| 2,716,422 | Whitlock | Aug. 30, 1955 |
| 2,807,275 | Steidley | Sept. 24, 1957 |
| 2,820,419 | Albertson | Jan. 21, 1958 |